United States Patent [19]

Schucker

[11] Patent Number: 4,688,986
[45] Date of Patent: Aug. 25, 1987

[54] BULB TURBINE EMERGENCY COUNTERWEIGHT SYSTEM

[75] Inventor: Thomas R. Schucker, York, Pa.

[73] Assignee: J. M. Voith GmbH, Brenz, Fed. Rep. of Germany

[21] Appl. No.: 202,878

[22] Filed: Nov. 3, 1980

[51] Int. Cl.4 .............................................. F01D 17/10
[52] U.S. Cl. ........................................ 415/24; 415/13; 415/150
[58] Field of Search ................... 415/13, 24, 150, 151; 212/195; 414/673; 187/70, 15, 94

[56] References Cited

U.S. PATENT DOCUMENTS

| 151,089 | 5/1874 | Call | 212/195 |
| 2,109,239 | 2/1938 | Scholl | 415/159 |
| 2,603,411 | 7/1952 | Trumpa | 415/159 |
| 3,845,842 | 11/1974 | Johnson | 187/94 X |

FOREIGN PATENT DOCUMENTS

| 0408514 | 3/1910 | France | 187/70 |
| 0767373 | 10/1980 | U.S.S.R. | 415/160 |

Primary Examiner—Harvey C. Hornsby
Assistant Examiner—Scott J. Haugland

[57] ABSTRACT

A fluid container associated with the wicket gate operating ring to receive fluid from a source so as to add an emergency counterweight to the gate operating ring upon failure of the gate operating ring servomotors.

6 Claims, 3 Drawing Figures

BULB TURBINE EMERGENCY COUNTERWEIGHT SYSTEM

BACKGROUND OF THE INVENTION

Normally it is required that the forces acting on the gate operating ring of a horizontal turbine machine be equally distributed. However, there has been a demand for a counterweight arrangement for providing a closing force if fluid pressure to the gate ring operator of a bulb turbine is lost. In providing an effective counterweight for the gate ring, the large weight destroys the equal distribution of forces on the particular gate operating ring.

Turbine machine size has increased with a corresponding increase in the size of the gate operating ring having a much larger radius. Thus, a greater unequal distribution of forces are applied to the bulb turbine gate ring. The greater unequal distribution of forces upon the gate ring requires that gate ring servomotors must be oversized to counteract the increase in the weight of the counterweight in an opening movement.

SUMMARY OF THE INVENTION

In resolving the problem, it was conceived that if the counterweight was available only when needed, such as at the time of loss of fluid pressure to the servomotors, then the unequal distribution of forces to the gate operating ring would not be a problem. In other words, by providing an emergency closure device which would act on the gate ring only when needed, a reduction in servomotor size would result and a balance of forces on the gate ring will be possible.

It is a general object of the invention to provide a counterweight system which is only active in an emergency situation.

Another object of the invention is to provide a counterweight system which is automatically activated when required and deactivated when not required.

Still another object of the invention is to provide a counterweight system which utilizes a flow of water to provide the necessary weight for a counterweight system when needed.

DESCRIPTION OF THE INVENTION

Figure 1:
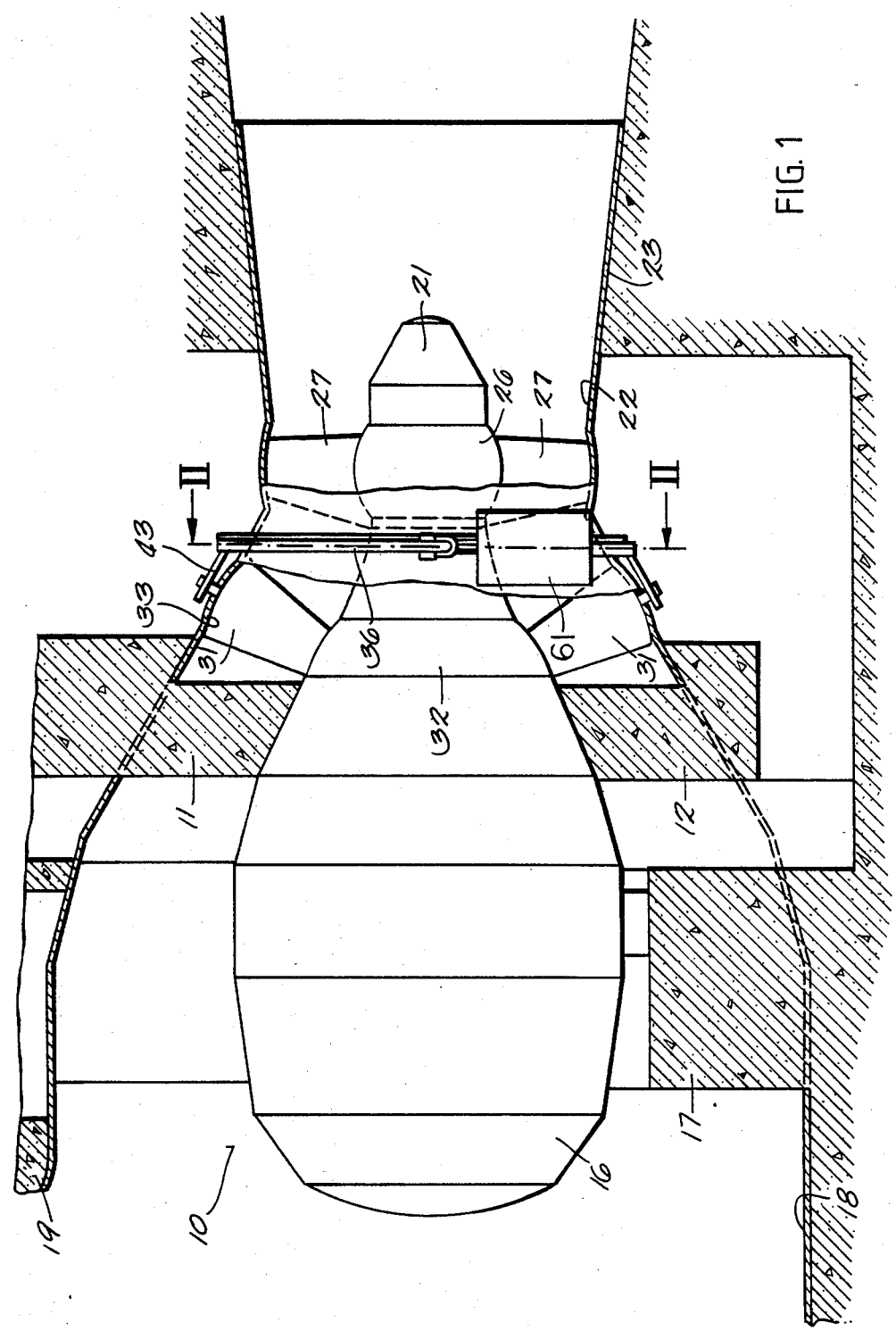
FIG. 1 is a view partly in section and partly in elevation through a penstock showing a bulb turbine therein having the counterweight system of the present invention.

As shown in FIG. 1, a bulb turbine generator unit 10 is supported by upper and lower stay columns 11 and 12, respectively. The machine includes a bulb portion 16 which is supported on a center pier 17 within the intake section 18 of a dam 19. Forward of the bulb 16 the machine includes a runner cone 21 located within the discharge ring 22 of the draft tube 23. A runner hub assembly 26 operatively supports a plurality of angularly adjustable runner blades 27 which radiate from the hub 26. A plurality of adjustable wicket gates 31 are supported by an inner gate barrel 32 and an outer gate barrel 33.

Figure 2:
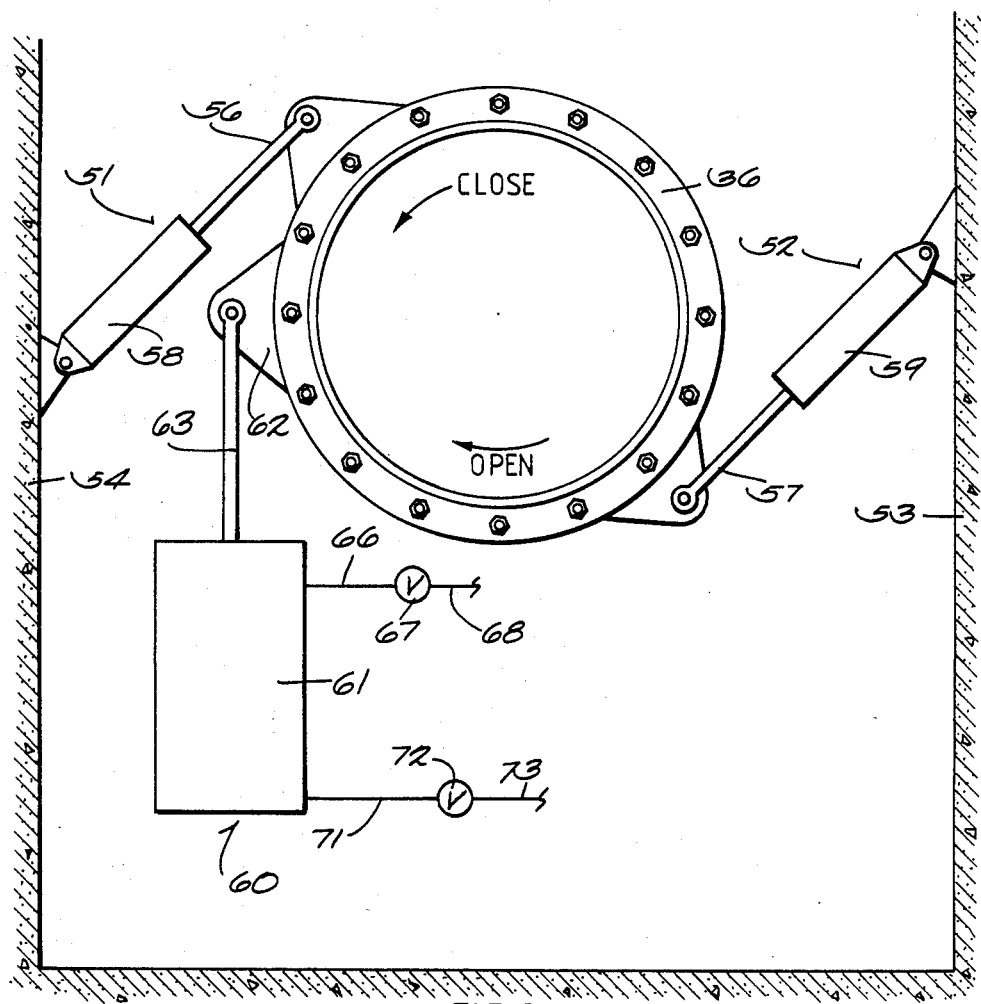
FIG. 2 is an enlarged sectional view through the bulb turbine taken in a plane represented by the lines II—II in FIG. 1, showing the gate ring, operating servomotors and the counterweight system of the present invention; and, FIG. 3 is an enlarged fragmentary view of a gate linkage connecting the wicket gate to the gate operating ring.
Figure 3:
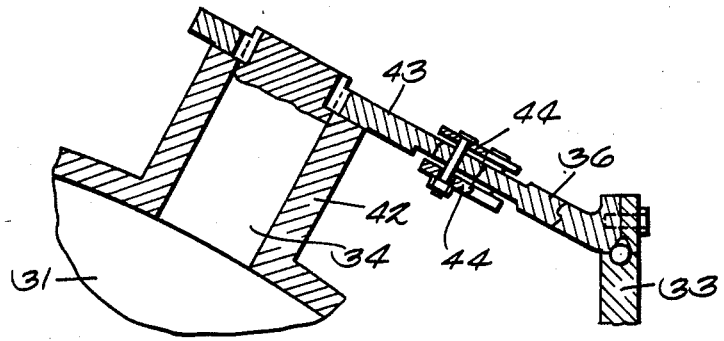

The angularly adjustable wicket gates 31 which control the flow of water to the runner blades 27 are positionable by operation of a gate operating ring 36. The gate operating ring 36 is movably supported on the outer gate barrel 33. The wicket gates 31 are operably connected in a well known manner to the gate operating ring 36 as shown in FIG. 3. As there shown, wicket gates 31 are provided with a stem 34 which receive a spacer hub 42. A lever arm 43 is keyed to the extending end of the gate stem and has its free end pivotally connected to a link 44. Link 44, in turn, has its opposite end secured to the gate operating ring 36. Thus, rotation of the ring 36 in a counterclockwise direction as viewed in FIG. 2 will serve to move the wicket gates 31 to closed positions. On the other hand, movement of the gate ring 36 in a clockwise direction as viewed in FIG. 2, will serve to open the gates.

Operation of the gate operating ring 36 is accomplished by means of a pair of servomotors 51 and 52 which are supported on brackets that are attached to the sidewalls 53 and 54 of the turbine gallery. As shown in FIG. 2, the gate operating ring 36 is positioned so that the wicket gates 31 will all be open. When the gates 31 are to be closed a signal will be obtained to cause the servomotors 51 and 52 to be energized to effect a retraction of their associated piston rods 56 and 57 within their associated cylinders 58 and 59. This will cause the gate operating ring 36 to be rotated in a counterclockwise direction, as viewed in FIG. 2, to thereby move the wicket gates to closed positions.

For emergency operation, in the event that fluid pressure to the servomotors 51 and 52 fail, or if the servomotors become inoperative for any reason, there is provided a counterweight system 60.

As shown in FIG. 2, the counterweight system 60 includes a fluid tank member 61. Tank 61 is suspended from a bracket 62 that is attached to the gate operating ring 36 by means of a rod 63. The tank 61 is provided with a fluid fill line 66 which communicates with the interior of the tank. (A control valve 67 is provided which may be a solenoid actuated valve for automatic operation or manual actuated valve.) A supply line 68 is connected to the inlet side of valve 67 for supplying fluid to the tank 61 when the valve is opened. At the lower end of the tank 61 there is provided a drain line 71 which is connected to a flow control valve 72. The outlet of the control valve 72 is in communication with a drain line 73.

In operation a loss of fluid pressure in the servomotors 51 and 52 will be detected by an alarm system (not shown). This will result in a signal being generated to energize the solenoid of valve 67 to open the valve. As a result, fluid will flow into the tank 61 filling the tank. As the fluid flows into tank 61, the weight of the fluid will effect rotation of the gate operating ring 36 in a counterclockwise direction, thereby effecting the movement of the wicket gates 31 to a closed position. With the gates closed, the solenoid of valve 67 will be deenergized to condition the valve to stop fluid flow to tank 61. After the emergency has been corrected, the solenoid of valve 72 will be energized by another signal and valve 72 will be energized to condition the valve to open allowing the tank to drain. After the tank has drained another signal is obtained to deenergize the solenoid of valve 72 to condition the valve to a closed position and the emergency cycle is complete.

With the present invention, a constant unequal force of a counterweight is not applied to the gate operating ring 36. Thus, the ring structure need not be oversized to accept such unequal force nor do the servomotors need to be oversized to counteract the constant applied counterweight mass. The counterweight herein disclosed is only applied to the gate operating ring 36 in response to an emergency.

The embodiments of the invention in which an exclusive property or privilege is claimed are defined as follows:

1. In operable combination with a bulb turbine having a gate operating ring rotatable about a generally horizontal axis between a gate open position and a gate closed position to open and close a plurality of wicket gates; and having primary means for rotating said gate operating ring between said open and closed positions; an apparatus for rotating said ring to said closed position when said primary means are inoperable without presenting an unbalanced load on said ring during normal operation of said primary means; comprising:

a counterweight depending from a side of said ring and having an initial weight insufficient to present an unbalanced load on said ring during normal operation of said primary means;

means for selectively increasing the weight of said counterweight when said primary means are inoperable to a weight sufficient to rotate said ring from said open to said closed position; and, means for selectively reducing the weight of said counterweight from said sufficient weight to said initial weight when said primary means regain operability whereby said ring does not experience unbalanced loads during normal operation of said primary means and said counterweight is operable to close said wicket gates upon failure of said primary means.

2. A bulb turbine according to claim 1, wherein said counterweight comprises a container operably depending from a side of said ring and having an empty weight insufficient to rotate said ring from said open to said closed position and said container being operable to receive and retain a fluid with said container and said retained fluid having a weight sufficient to rotate said ring from said open to said closed position;

fluid conducting means connecting said container to a source of fluid;

drain means connected to said container and operable to permit fluid to drain from said container;

first valve means interposed in said fluid conducting means between said container and said fluid source and selectively operable to permit fluid to flow from said source into said container; and second valve means connected to said drain means and selectively operable to permit fluid within said container to drain.

3. A bulb turbine according to claim 2 wherein said fluid is water.

4. A bulb turbine according to claim 3 wherein said primary means for rotating said ring comprises a plurality of servomotors operably connected to said ring to rotate said ring.

5. In operable combination with a bulb turbine having a gate operating ring rotatable about a generally horizontal axis between a gate open position and gate closed position; primary means for rotating said ring comprising a plurality of servomotors each having one end pivotally secured to said ring and another end pivotally secured to a turbine gallery; said servomotors operable to cooperate to rotate said ring between said open and closed positions; an apparatus for rotating said ring to said closed position when said primary means are inoperable without presenting an unbalanced load on said ring during normal operation of said primary means; comprising:

a counterweight having a tank member operable to receive and retain a fluid with means for supporting said tank in depending relation to a side of said ring such that a downward force at said side would urge said ring to rotate to said closed position with said tank member and supporting means operable to follow said side as said ring rotates between said open and closed position under operation of said servomotors and said tank member and said supporting means being of insufficient weight to rotate said ring to said closed position;

fluid conducting means connecting said tank member to a source of a fluid;

first valve means interposed in said fluid conducting means between said tank member and said fluid source for selectively permitting fluid to flow from said source to said tank member and retained within said tank when said servomotors are inoperable with said tank member and said retained fluid having a weight sufficient to present a downward force at said side of said ring to rotate said ring to said closed position when said servomotors are inoperable;

drain means connected to said tank member and operable to permit fluid to drain from said tank member;

second valve means connected to said drain means and selectively operable to permit said retained fluid within said tank member to drain from said tank member whereby said tank member may be filled with fluid and have sufficient weight to rotate said ring to a closed position when said servomotors fail and said tank member may be drained of fluid when said servomotors are operational to present a lower force urging said ring to a closed position than would be possible with said counterweight having a constant weight permitting employment of servomotors for operating said ring of a smaller size than would be possible with a counterweight of constant weight.

6. A bulb turbine according to claim 5, wherein said fluid is water.